(12) United States Patent
Nayshtut et al.

(10) Patent No.: US 9,948,468 B2
(45) Date of Patent: Apr. 17, 2018

(54) DIGITAL HERITAGE NOTARY

(71) Applicant: McAfee, LLC., Santa Clara, CA (US)

(72) Inventors: Alex Nayshtut, Gan Yavne (IL); Oleg Pogorelik, Lapid (IL); Avishay Sharaga, Bet Nehemya (IL); Ned M. Smith, Beaverton, OR (US); Igor Muttik, Berkhamsted (GB)

(73) Assignee: McAfee, LLC, Plano, TX (US)

( * ) Notice: Subject to any disclaimer, the term of this patent is extended or adjusted under 35 U.S.C. 154(b) by 0 days.

(21) Appl. No.: 14/582,150

(22) Filed: Dec. 23, 2014

(65) Prior Publication Data
US 2016/0182240 A1 Jun. 23, 2016

(51) Int. Cl.
*G06F 21/00* (2013.01)
*H04L 9/32* (2006.01)
*H04L 29/06* (2006.01)

(52) U.S. Cl.
CPC ........ *H04L 9/3268* (2013.01); *H04L 63/0815* (2013.01); *H04L 63/0823* (2013.01)

(58) Field of Classification Search
CPC .................. H04L 9/3268; H04L 63/0823; H04L 63/0815
USPC ...... 726/1, 9, 6, 10; 713/158, 156, 153, 173, 713/176, 182; 705/65, 59, 75; 380/28, 380/33, 44, 279, 231, 255
See application file for complete search history.

(56) References Cited

U.S. PATENT DOCUMENTS

| | | | | |
|---|---|---|---|---|
| 5,721,781 | A * | 2/1998 | Deo ..................... | G06Q 20/341 705/67 |
| 5,987,610 | A * | 11/1999 | Franczek .............. | G06F 21/564 726/24 |
| 6,073,142 | A * | 6/2000 | Geiger ................. | G06Q 10/107 709/204 |
| 6,460,050 | B1 * | 10/2002 | Pace .................... | G06Q 10/107 |
| 6,748,531 | B1 * | 6/2004 | Epstein .................. | G06F 21/10 713/158 |

(Continued)

FOREIGN PATENT DOCUMENTS

WO 2016105859 A1 6/2016

OTHER PUBLICATIONS

Petkovic et al., Digital Inheritance of Personal and Commercial Content Using DRM, IEEE, 2007.*

(Continued)

*Primary Examiner* — David García Cervetti
(74) *Attorney, Agent, or Firm* — Patent Capital Group (57) ABSTRACT

In an example, a DHN (DHN) is provided for enabling grantees to access digitally-controlled assets of a principal. The principal (level 0) establishes a digital testament (DT), identifying one or more grantees on levels 1-n. Each grantee receives a digital heritage certificate (DHC), which may be based on the PKI certificate definition. The DHC includes a "PREDECESSORS" field, identifying one or more predecessor certificates that must be revoked before the DHC is valid. All grantee DHCs have the principal's level 0, DHC as a predecessor certificate. Level n certificates may also be valid only if all certificates at level n−1, have been revoked. In practice, a DHC may be revoked when a user of the certificate passes away, so that nth generation grantees inherit only when generation n−1, has passed away.

23 Claims, 6 Drawing Sheets

(56) References Cited

U.S. PATENT DOCUMENTS

| | | | | |
|---|---|---|---|---|
| 7,506,155 B1* | 3/2009 | Stewart | G06F 21/56 | 713/150 |
| 8,554,681 B1* | 10/2013 | Wieder | G06F 21/10 | 705/51 |
| 8,745,718 B1* | 6/2014 | Dufel | H04L 63/0807 | 713/155 |
| 9,412,390 B1* | 8/2016 | Chaudhary | G10L 21/00 | |
| 9,626,667 B2* | 4/2017 | Boccon-Gibod | G06Q 20/1235 | |
| 2002/0019744 A1* | 2/2002 | Yamamoto | G06Q 10/10 | 705/312 |
| 2002/0108041 A1* | 8/2002 | Watanabe | H04L 9/3252 | 713/175 |
| 2003/0023880 A1* | 1/2003 | Edwards | H04L 63/0815 | 726/1 |
| 2003/0140003 A1* | 7/2003 | Wang | G06Q 20/10 | 705/39 |
| 2003/0149781 A1* | 8/2003 | Yared | G06F 21/41 | 709/229 |
| 2004/0083359 A1* | 4/2004 | Camus | H04L 9/3273 | 713/156 |
| 2004/0100363 A1* | 5/2004 | Lane | G06K 19/025 | 340/5.86 |
| 2004/0168056 A1* | 8/2004 | Dillaway | G06F 21/10 | 713/156 |
| 2004/0193329 A1* | 9/2004 | Ransom | H04L 63/20 | 700/286 |
| 2005/0060571 A1* | 3/2005 | Wang | G06Q 50/184 | 726/27 |
| 2005/0114653 A1* | 5/2005 | Sudia | H04L 63/0823 | 713/158 |
| 2005/0120205 A1* | 6/2005 | Umezawa | H04L 63/0442 | 713/156 |
| 2005/0131583 A1* | 6/2005 | Ransom | H04L 63/08 | 700/295 |
| 2005/0144437 A1* | 6/2005 | Ransom | G06F 1/28 | 713/151 |
| 2005/0193221 A1* | 9/2005 | Yoneyama | G06F 21/6218 | 726/5 |
| 2005/0204164 A1* | 9/2005 | Kakii | H04L 9/3268 | 726/5 |
| 2005/0234859 A1* | 10/2005 | Ebata | G06F 21/6218 | |
| 2005/0262572 A1* | 11/2005 | Yoneyama | G06F 21/6218 | 726/27 |
| 2006/0218630 A1* | 9/2006 | Pearson | G06F 21/41 | 726/8 |
| 2007/0056019 A1* | 3/2007 | Allen | G06Q 10/06 | 726/1 |
| 2007/0056034 A1* | 3/2007 | Fernstrom | G06F 21/6227 | 726/20 |
| 2007/0204078 A1* | 8/2007 | Boccon-Gibod | G06F 21/10 | 710/54 |
| 2007/0250714 A1* | 10/2007 | Kawada | H04N 1/32101 | 713/175 |
| 2008/0010448 A1* | 1/2008 | Sabnis | H04L 9/3263 | 713/156 |
| 2008/0010449 A1* | 1/2008 | Holtzman | G06F 21/445 | 713/157 |
| 2008/0010451 A1* | 1/2008 | Holtzman | H04L 9/3228 | 713/158 |
| 2008/0028445 A1* | 1/2008 | Dubuc | H04L 63/08 | 726/5 |
| 2008/0065899 A1* | 3/2008 | Dillaway | G06F 21/6218 | 713/185 |
| 2008/0066160 A1* | 3/2008 | Becker | G06F 21/62 | 726/4 |
| 2008/0066171 A1* | 3/2008 | Becker | G06F 21/6236 | 726/9 |
| 2008/0097776 A1* | 4/2008 | Rawls | G06Q 10/103 | 705/301 |
| 2008/0141339 A1* | 6/2008 | Gomez | H04L 63/08 | 726/1 |
| 2008/0167994 A1* | 7/2008 | Li | G06F 21/10 | 705/52 |
| 2009/0327579 A1* | 12/2009 | Panabaker | G06F 1/3203 | 711/103 |
| 2010/0313014 A1* | 12/2010 | Medvinsky | G06F 21/10 | 713/158 |
| 2011/0004753 A1* | 1/2011 | Gomi | H04L 63/0807 | 713/156 |
| 2011/0202755 A1* | 8/2011 | Orsini | H04L 63/029 | 713/151 |
| 2011/0231919 A1* | 9/2011 | Vangpat | H04L 63/0815 | 726/8 |
| 2011/0238999 A1* | 9/2011 | Lee | G06Q 10/10 | 713/178 |
| 2012/0072720 A1* | 3/2012 | Rescorla | H04L 9/3268 | 713/158 |
| 2013/0166907 A1* | 6/2013 | Brown | H04L 9/3265 | 713/156 |
| 2013/0318590 A1* | 11/2013 | Matsugashita | H04L 63/0815 | 726/8 |
| 2013/0340062 A1* | 12/2013 | Kobayashi | H04L 63/0815 | 726/8 |
| 2014/0020051 A1* | 1/2014 | Lu | G06F 21/6218 | 726/1 |
| 2014/0026229 A1* | 1/2014 | Bertin | G06F 21/604 | 726/28 |
| 2014/0032430 A1* | 1/2014 | Sieger | G06Q 50/18 | 705/311 |
| 2014/0195026 A1* | 7/2014 | Wieder | H04L 67/306 | 700/94 |
| 2014/0324678 A1* | 10/2014 | Heine, III | G06Q 50/167 | 705/39 |
| 2014/0344161 A1* | 11/2014 | Sato | G06Q 20/105 | 705/67 |
| 2015/0113596 A1* | 4/2015 | Mogaki | H04L 63/0815 | 726/3 |
| 2015/0128039 A1* | 5/2015 | Wieder | G06F 3/0481 | 715/716 |
| 2015/0207786 A1* | 7/2015 | Pitroda | G06F 17/30011 | 726/28 |

OTHER PUBLICATIONS

International Search Report and Written Opinion in International Application No. PCT/US2015/062842 dated Mar. 9, 2016.

International Preliminary Report on Patentability issued in International Application No. PCT/US2015/062842 dated Jun. 27, 2017; 9 pages.

* cited by examiner

DIGITAL HERITAGE NOTARY

FIELD OF THE DISCLOSURE

This application relates to the field of computer and network security, and more particularly to a system and method for providing a digital heritage notary.

BACKGROUND

Public key infrastructure (PKI) is a specification of hardware, software, and user activities for authenticating a user, machine, or other object. A certificate authority issues a certificate to a user, and a validation authority authenticates the user's certificate. PKI is an extensible standard, and the PKI certificate definition provides for a number of fields, including several expansion or user-definable fields.

Security assertion markup language (SAML) is an extensible markup language (XML)-based authentication standard in which SAML assertions can include authentication statements, attribute statements, and authorization decision statements. Authentication statements assert that a user authenticated with an identity provider at a particular time is using a particular authentication method. "Authentication context" may also be provided, including additional information about the authenticated user.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

In an example, a digital heritage notary (DHN) is provided for enabling grantees to access digitally-controlled assets of a principal. The principal (level 0) establishes a digital testament (DT), identifying one or more grantees on levels 1-n. Each grantee receives a digital heritage certificate (DHC), which may be based on the PKI certificate definition. The DHC includes a "PREDECESSORS" field, identifying one or more predecessor certificates that must be revoked before the DHC is valid. All grantee DHCs have the principal's level 0 DHC as a predecessor certificate. Level n certificates may also be valid only if all certificates at level n-1 have been revoked. In practice, a DHC may be revoked when a user of the certificate passes away, so that nth generation grantees inherit only when generation n-1 has passed away.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

Throughout many parts of the world, inheritance, probate, wills, ascendancy, sanguinity, and other legal theories broadly related to the disposition of assets upon an individual's death may form a complex maze of arcane rules and requirements, full of traps for the unwary and substantial barriers to final results. Thus, certain principals (principals) have recognized the value of using estate planning vehicles such as life estates, rights of survivorship, reversionary interests, and other non-probate vehicles for disposing of assets. However, some of these vehicles include undesirable features such as limitations on the principal's ability to use assets during his lifetime, or granting grantees too much access to assets during the principal's lifetime. Such a body of law can be further complicated by digital assets, which a user or principal may wish to pass to one or more grantees upon his demise.

The present Specification provides a system and method that provide one or more computing apparatuses operable as a "DHN" (DHN) configured to manage a "digital testament" (DT) for the principal. The DT is a conceptual framework in which the principal designates one or more levels of grantees. The principal and each grantee each receive a "digital heritage certificate" (DHC), which in one example is based on the PKI certificate definition, with an additional or user-defined field for "PREDECESSORS." The PREDECESSORS field identifies one or more predecessor certificates that must be revoked before the DHC is valid. The principal's DHC has no predecessors, so that his certificate is valid while he is alive. When the principal dies, the grantees may provide proof of death to a certificate authority (CA), which may then publish a certificate revocation list (CRL), including the principal's DHC. The grantee DHCs may each include a CRL distribution point (CDP) field, pointing to the CA that publishes the CRL. A particular DHC is valid if and only if all of its predecessor DHCs appear on the CRL. This allows the principal to easily and seamlessly provide his grantees with access to certain digitally-controlled assets immediately upon his death, without the necessity of arcane probate procedures and other similar rules.

A DT may be useful, for example, in social networking contexts. The principal may have a plurality of Email, social networking accounts, including general networking accounts, blogging, photography, genealogy, microblogging, and chatting by way of non-limiting example. The principal may wish to permit one or more family members to access those accounts upon his death, either to convert the accounts to memorial pages in his behalf, or to be able to keep in touch with the principal's contacts and friends.

Digitally-controlled assets may also include more concrete assets, such as bank accounts, crypto currencies (like Bitcoin), investment accounts, contractual rights and obligations, for-pay services, and similar assets that the principal may wish to bequeath upon family members. In that case, is it is advantageous for the grantees to be able to access those accounts quickly upon the principal's death. For example, the grantees may need near real-time access to the principals bank accounts to have funds available for funeral and burial services, and to handle bills and other liabilities on behalf of the principal.

In general, a wide variety of assets are available via digital authentication, and it is advantageous to provide a system and method for streamlining and simplifying one or more grantee's ability to access those assets, and to know which assets are available for access, shortly after the principals death.

It should also be noted that the death of the principal is used throughout this specification as a non-limiting example, any provable condition precedent can be used for a DT in a general sense. Thus, the principal and grantees need not be family, or even familiar. The DT could just as easily be used, for example, to escrow a digital asset, with the condition being financial insolvency of a principal corporation, or simply passage of time. A DHC may also have a built-in expiry on a date certain in the future, so that a grantee is guaranteed to receive access to an asset on that date. Many other applications, conditions, rules and hierarchies are possible, and are intended to be included within the scope of this Specification.

In one example, a DT is provided as a hierarchical scheme. The principal or principal may be designated as the "level 0" or L0 user when he signs up for a DT service with a DHN. When the principal signs up, he receives a principal DHC, with a blank or null PREDECESSORS field, or that otherwise indicates that there are no predecessors to this certificate. The principal may then designate one or more grantees in a hierarchical fashion. In one example, the DHN provides a web interface with a suitable graphical user interface (GUI) for the principal to accomplish this. Upon designating grantees, the principal may receive a certificate to forward to each, or may provide contact information such as an e-mail address so that the DHN can directly deliver certificates to the grantees.

The principal may thus distribute one or more level 1 (L1) DHC's to L1 grantees. DHCs may take any suitable digital form (like files on a CD/DVD/BD disk or on a USB drive) or physical (like printouts or photographs of the DHC data). The DHCs may employ error-correction techniques to increase the reliability of their transmission, copying, storing and format conversions (like employing optical character recognition to obtain the original digital DHCs from a physical form). A physical form may be useful in some countries as it may be physically witnessed and countersigned as a legal will under the law. This combined method may assist in performing a seamless transition from a traditional method of inheriting assets to the digital one. In this case, the L1 grantees' certificates will be subject to revocation of the principal DHC. In other words, the L1 certificates are only valid if the L0 certificate has been revoked. Once the L0 certificate has been revoked, the L1 certificates become immediately valid.

In one example, the Principal may also wish to provide for one or more level 2 (L2) grantees. For example, the L1 grantees may be children of the principal, while the L2 grantees may be grandchildren of the principal. The Principal may wish to activate the L2 grantees' certificates only if both he and the L1 grantees are deceased. In other words, the grandfather may wish to allow his grandchildren access to his digital assets only if his (the principal's children) are all deceased as well. In another example, each child of the principal may have one or more children who are grandchildren to the principal. In that case, the principal may wish to may wish to grant each set of grandchildren access to his digital assets only if those grandchildren's own parents are deceased (not necessarily the entire L1 generation).

The hierarchy is provided in this example by the DHCs themselves. Specifically, in one example, each DHC is a valid PKI certificate issued by a trusted CA. Advantageously, PKI is an extensible standard with a plurality of available unused fields, so that each DHC may be a standards-compliant PKI certificate. It should be noted however the PKI is disclosed by way of example only, and that other certificate standards are available, or a system designer may choose to provide a customized certificate format. Thus it is intended that the specification and the appended claims broadly encompass any suitable certificate format, regardless of whether it is compliant with the PKI standard or any standard at all.

In the case where the DHC is a PKI certificate, a new field is defined and designated as the PREDECESSOR field. Each DHC is considered valid, and is validated by the DHN, only if all of its predecessor certificates have been revoked. So for example, L1 grantees are subject to the principal's certificate. As long as the principal's DHC remains valid, the L1 certificates will not be validated by the DHN. However, when the principal dies (or the condition precedent is otherwise provably fulfilled), then the L1 grantees may provide proof of the condition to the DHN provider, which then revokes the principal DHC. Now that the principal DHC has been revoked, attempts to authenticate with the L1 DHCs will be validated by the DHN.

Similarly, the L2 grantees' certificates are subject to their respective L1 DHCs, and to the principal DHC. So, for example, a parent may have 3, children, each of which has an L2 DHC. Those L2 DHCs will be valid only if the parent's L1 DHC has been revoked and the principal DHC has also been revoked. If both of these conditions are not met, then the L2 DHCs cannot be successfully authenticated.

A three-level hierarchical scheme is provided here by way of example, but those with skill in the art will recognize that the level of nesting of DHC's is arbitrary, and need not be limited by this disclosure. Additional levels designated as L3 and beyond may be provided for great-grandchildren, great-great-grandchildren and so on. It should also be noted that generational divides are used by way of example only. The principal may arbitrarily designate levels, based on individual preferences, regardless of relation or degree.

It will be readily apparent that many other configurations and uses for a digital heard heritage notary are available, and it is intended that the present specification include all such configurations and variations that are within the spirit and scope of the appended claims.

Figure 1:
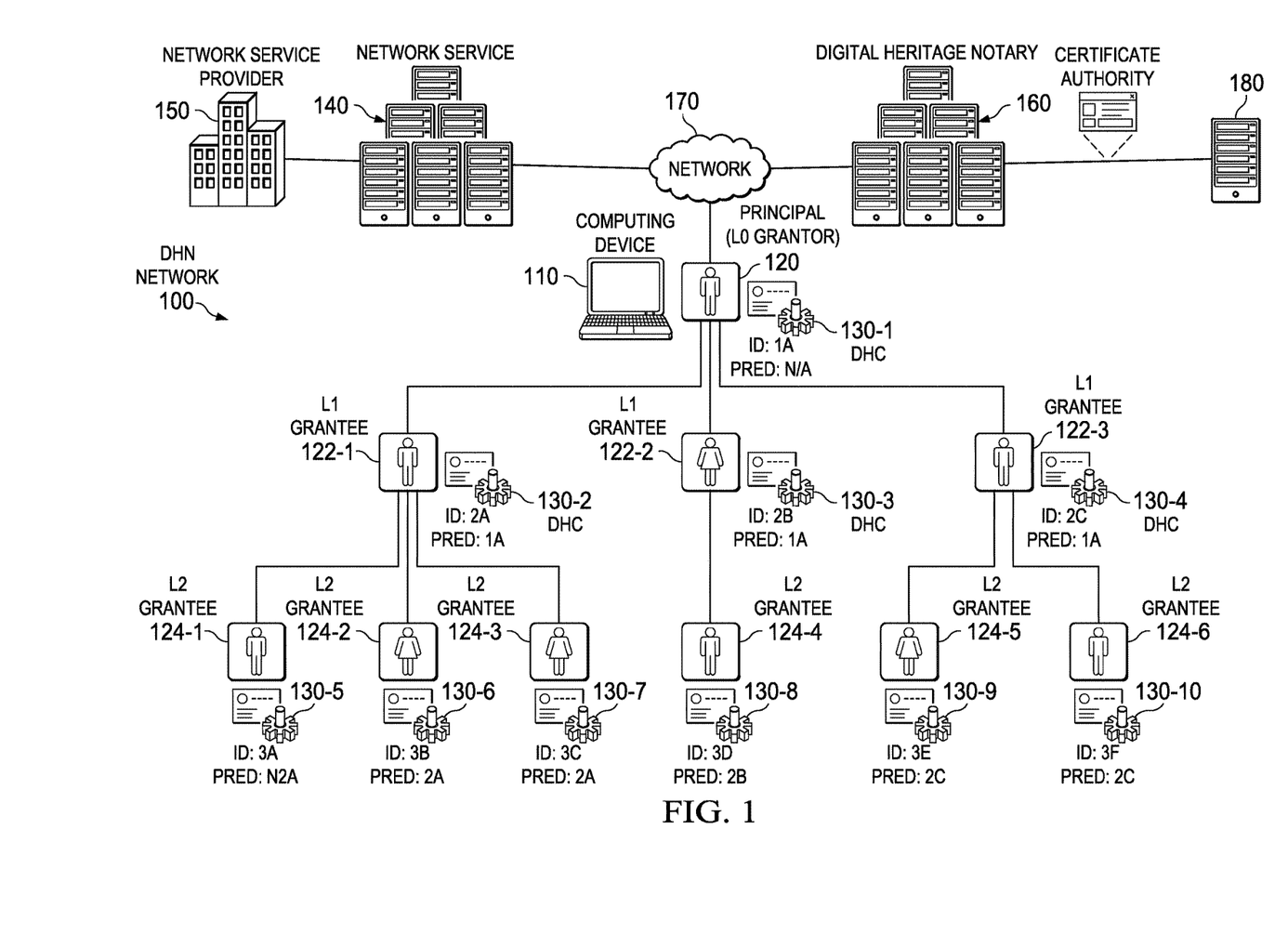
FIG. 1 is a block diagram of a digital testament tree according to one or more examples of the present Specification.

FIG. 1 is a block diagram of a DHN network according to one or more examples of the present specification. In this case, DHN network 100 operates via a network 170, which may be any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

In this case, an L0 grantor, designated as principal 120, operates a computing device 110 by which he accesses a network service 140 provided by a network service provider 150. Computing device 110 may communicate with network service 140 via network 170. Network service 140 may be any suitable network service that provides access to a digitally-controlled asset as described herein. Network service provider 150 may be any suitable person, entity, business, or other enterprise that operates network service 140.

Principal 120 receives a principal DHC 130-1, with example identifier 1A. Principal 120 may then use computing device 110 to log into network service 140 via network 170. In one example, network service provider 150 may provide a single sign-on (SSO) service. SSO may include authentication via SAML, extensible access control markup language (XACML), or a similar mechanism, such as online authorization assertion protocols, including OAUTH2, and OpenID-Connect. If SAML is used, then authentication may provide a SAML assertion, which in one example is a SAML authentication statement. SAML authentication statements may include an "authentication context," which provides additional information about the authentication. In one example, the authentication context includes a list of predecessor DHCs. In the case of principal DHC 130-1, the PREDECESSORS field is blank or null, indicating that there are no predecessors. Thus, authentication proceeds without checking whether any DHCs have been revoked.

In another example, network service 140 may provide two-factor authentication, wherein principal 120 enters a username and password and also provides principal DHC 130-1 during the authentication process. In another example, principal 120 is able to login to network service 140 with a username and password, but is able to use principal DHC 130-1 to recover or reset a username or password. Biometric and multi-factor authentication may also be employed in which case DHC 130-1 may be used by the provider 150 to locate and/or unlock the relevant authentication data.

Network service provider 150 may have a trusted relationship with certificate authority 180. Thus, when principal 120 provides principal DHC 130-1 to network service 140, network service provider 150 provides the certificate to certificate authority 180, which may be operated by or separate from DHN 160. Certificate authority 180 inspects DHC 130-1, and determines that it is a valid certificate with no unrevoked predecessors. Thus, certificate authority 180 provides a validation signal to network service 140, whereupon network service 140 authenticates principal 120.

User 120 also interacts with DHN 160. Specifically, DHN 160 may, at principal 120's request, provide L1 DHC's to principal 120's L1 grantees. In one example, principal 120 requests three L1 certificates for his three children. The children are L1 grantee 122-1, L1 grantee 122-2, and L1 grantee 122-3. L1 grantee 122-1 receives DHC 130-2, which is designated as DHC 2A. DHCs 130-2, 130-3, and 130-4 each have certificate 1A (principal DHC 130-1) listed as a predecessor in their PREDECESSOR fields. DHN 160 may also provide to principal 120 services to track and manage issued DHCs, such as to avoid conflicts or duplicates, which may occur if several grantees are given DHCs that provide access to the same network service 140 at the same time. DHN 160 may also verify and warn about approaching expiration timestamps (or "valid after" timestamps) and similar.

In this configuration, principal 120 has provided L1 grantees 122 all of the credentials that they will need to access his account on network service 140, provided that certificate authority 180 validates their respective DHCs 130. However, certificate authority 180 will only validate DHCs 130 of L1 grantees 122 if the certificate for Principal 120 has been revoked. This may occur, for example, if L1 grantees 122 provide proof of death (or proof of any other condition precedent) to DHN 160, whereupon DHN 160 may instruct certificate authority 180 to revoked principal DHC 130-1. Each DHC 130 may have a CDP that points to a CRL published by CA 180.

Principal 120 may also wish to make provision for his grandchildren (designated as L2 grantees 124) to be able to access his account on network service 140 provided their respective parents are deceased. Thus, principal 120 may provide to L2 grantees 124 respective L3 DHCs 130. L2 grantee 124-1 receives DHC 130-5 with ID 3A, and predecessor 2A, which itself has a predecessor of principal DHC 1A. L2 grantee 124-2 receives DHC 130-6 with ID 3B and predecessor 2A. L2 grantee 124-3 receives DHC 130-7 with ID 3C and predecessor 2A. Thus, L2 grantees 124-1, 124-2, and 124-3 will be able to access principal 120s account on network service 140 only if both DHCs 130-2 and 130-1 have been revoked.

Alternatively, principal 120 may designate an entire class of certificates as needing to be revoked before L2 grantees 124 can access his account. This may be the case, for example, if principal 120 only wants L2 grantees 124 to be able to access his account on network service 140 if all L1 grantees are deceased. In that case, principal 120 may designate L2 DHCs as belonging to one class, and L1 DHC's as belonging to a second class. The PREDECESSORS field of L2 DHCs may then indicate that the DHC is valid only if all certificates belonging to class L1 have been revoked. Thus, in this example, if an L2 grantee 124 attempts to login via network service 140, network service 140 will authenticate L2 grantee 124 only if certificate authority 180 returns a validation signal. Certificate authority 180 will return a validation signal only if all certificates belonging to the L1 class have been revoked. The DHC may also contain more complex rules than just a list of PREDECESSORS or classes based, for example, on algorithmic decisions or scripted logical operations (for example, "The DHC is valid if 130-1 is revoked before 130-2, otherwise ignore 130-1 and 130-2 and, instead, wait for revocation of 130-3"). In practice, a system designer will designate appropriate rules or algorithms to meet the design requirements of a particular embodiment.

Continuing with L2 grantees, L1 grantee 122-2 has one child, specifically L2 grantee 124-4. L2 grantee 124-4 owns DHC 130-8, with ID 3D and predecessor DHC 2B, belonging to L1 grantee 122-2.

L1 grantee 122-3 has two children, namely L2 grantee 124-5 and L2 grantee 124-6. L2 grantee 124-5 owns DHC 130-9 identified as 3E, with predecessor 2C. L2 grantee 124-6 owns certificate 130-10 with ID 3F and predecessor 2C.

It should be noted that principal 120 may have multiple accounts on multiple network services 140 operated by multiple network service providers 150. In this case, so long as principal 120 authenticates with the same DHC 130-1 to each network service 140 (for example via SAML or XACML), then account rights will propagate as described herein. If principal 120 wants to exercise even finer grained control over certain digital assets, he may issue different certificates to grantees for different accounts. For example, principal 120 may designate L1 grantee 122-1 as the person for managing his cash accounts. Thus, principal 120 will issue a DHC 130-2 to L1 grantee 122-1 for accessing the cash accounts. However, principal 120 may wish for L1 grantee 122-2 to manage his investment accounts. Thus, principal 120 may issue to L1 grantee 122-2 a different DHC 130-3 that allows her to access his investment accounts. Finally, principal 120 may wish L1 grantee 122-3 to manage his real estate accounts, and thus grants yet another DHC 130-4 for that purpose. Many other configurations are possible.

Figure 2:
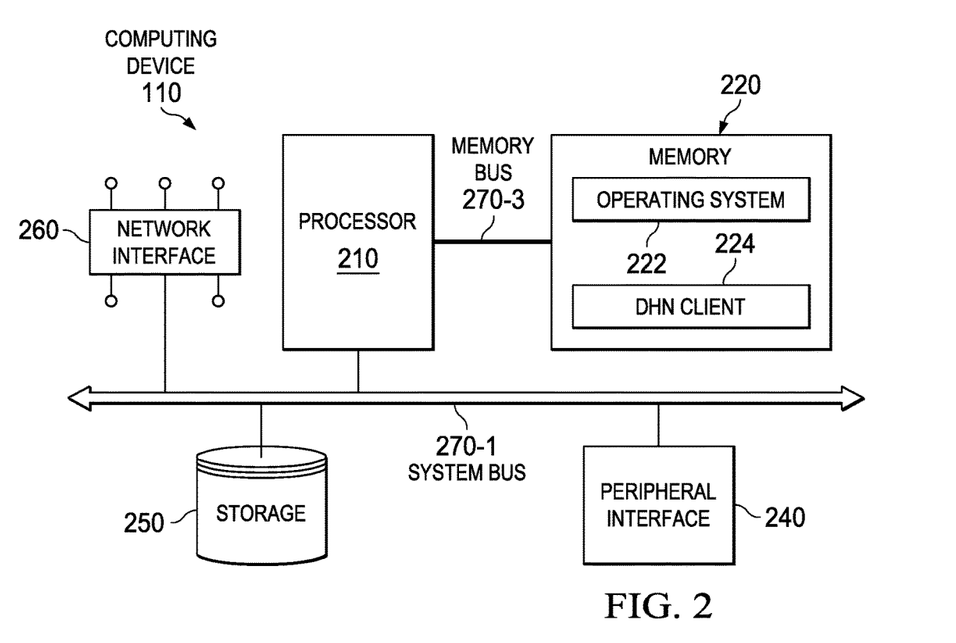
FIG. 2 is a block diagram of a computing device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, workstation, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

Client device 110 includes a processor 210 connected to a memory 220, having stored therein executable instructions for providing an operating system 222 and at least software portions of a DHN client 224. Other components of client device 110 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of DHN client 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

DHN client 224, in one example, is operable to carry out computer-implemented methods, including the methods described in this Specification for providing DHN client services. DHN client 224 may include one or more non-transitory computer-readable mediums having stored thereon executable instructions operable to instruct a processor to provide a security engine. As used throughout this Specification, an "engine" includes any combination of one or more logic elements, of similar or dissimilar species, operable for and configured to perform one or more methods provided by the engine. Thus, DHN client 224 may comprise one or more logic elements configured to provide security engine methods as disclosed in this Specification. In some cases, DHN client 224 may include a special integrated circuit designed to carry out a method or a part thereof, and may also include software instructions operable to instruct a processor to perform the method. In some cases, DHN client 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that DHN client 224 may also include other hardware and software, including configuration files, registry entries, and interactive or user-mode software by way of non-limiting example.

In one example, DHN client 224 includes executable instructions stored on a non-transitory medium operable to perform a method according to this Specification. At an appropriate time, such as upon booting client device 110 or upon a command from operating system 222 or a user 120, processor 210 may retrieve a copy of DHN client 224 (or software portions thereof) from storage 250 and load it into memory 220. Processor 210 may then iteratively execute the instructions of DHN client 224 to provide the desired method.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
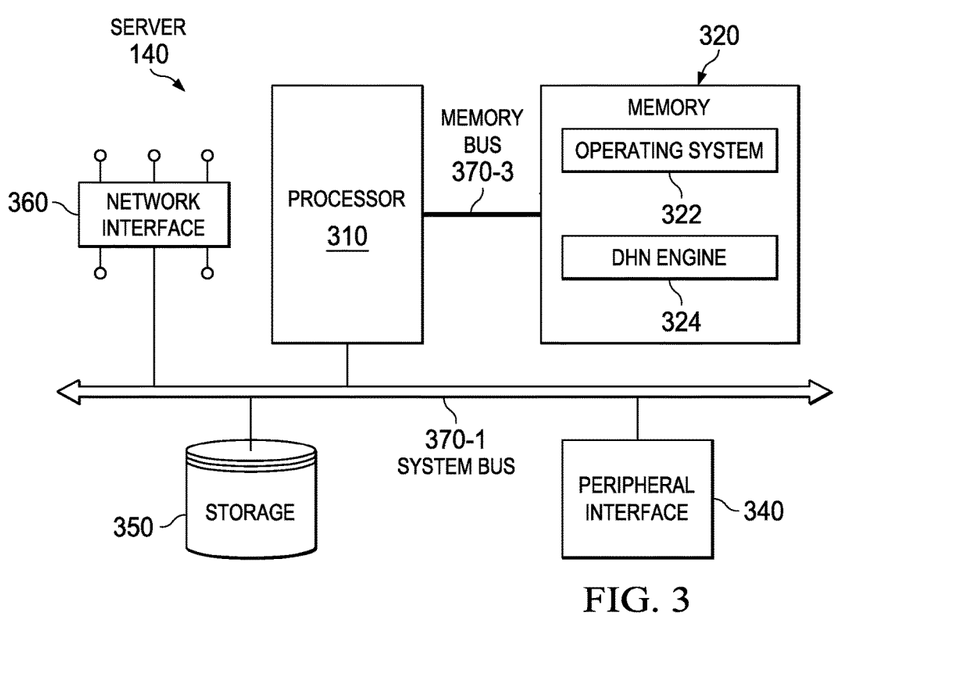
FIG. 3 is a block diagram of a server according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise. Server 140 is described herein separately to illustrate that in certain embodiments, logical operations according to this Specification may be divided along a client-server model, wherein client device 110 provides certain localized tasks, while server 140 provides certain other centralized tasks.

Server 140 includes a processor 310 connected to a memory 320, having stored therein executable instructions for providing an operating system 322 and at least software portions of a DHN engine 324. Other components of server 140 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of DHN engine 324.

Network interface 360 may be provided to communicatively couple server 140 to a wired or wireless network, and may include one or more logic elements as described in FIG. 2.

Figure 5:
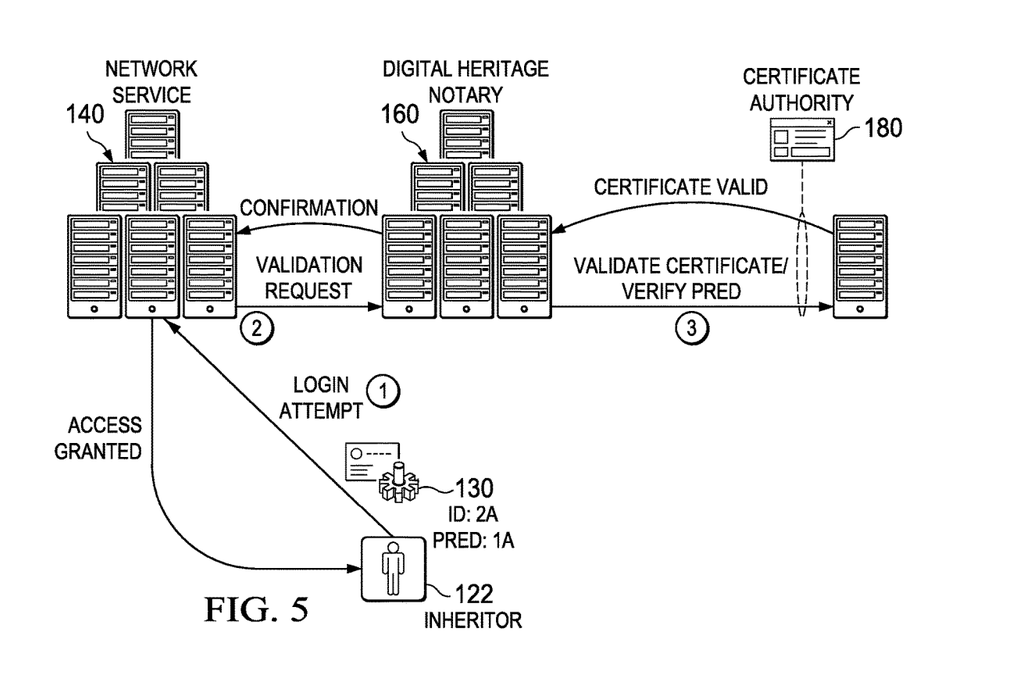
FIG. 5 is a signal flow diagram of third-party authentication according to one or more examples of the present Specification.

DHN engine 324 is an engine as described in FIG. 2 and, in one example, includes one or more logic elements operable to carry out computer-implemented methods, such as method 500 of FIG. 5, or other methods according to this Specification. Software portions of DHN engine 324 may run as a daemon process.

DHN engine 324 may include one or more non-transitory computer-readable mediums having stored thereon executable instructions operable to instruct a processor to provide a security engine. At an appropriate time, such as upon booting server 140 or upon a command from operating system 222 or a user 120 or security administrator 150, processor 310 may retrieve a copy of DHN engine 324 (or software portions thereof) from storage 350 and load it into memory 320. Processor 310 may then iteratively execute the instructions of DHN engine 324 to provide the desired method.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. Peripherals may include, by way of non-limiting examples, any of the peripherals disclosed in FIG. 2.

Figure 4:
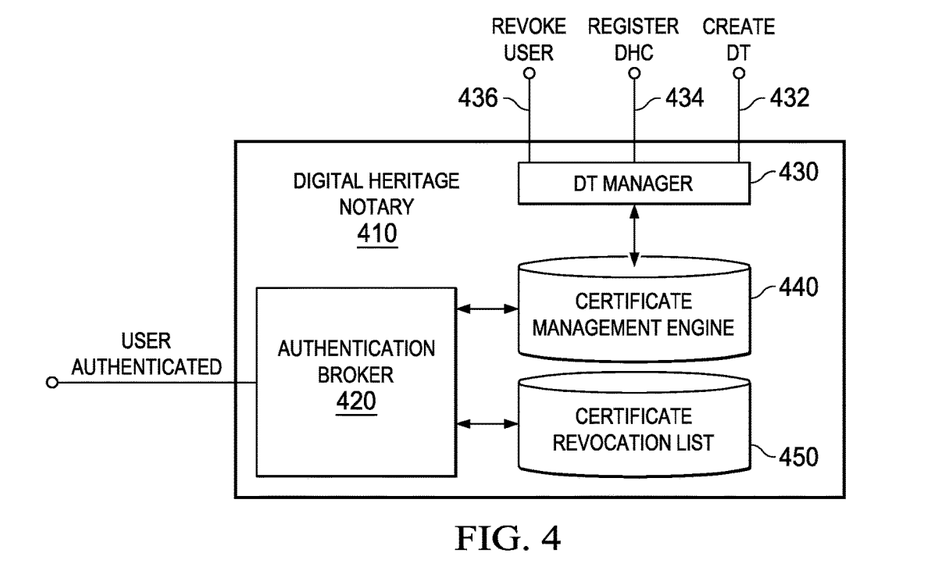
FIG. 4 is a functional block diagram of a digital heritage notary according to one or more examples of the present Specification.

FIG. 4 is a functional block diagram of a DHN engine 410 according to one or more examples of the present specification. DHN engine may be provided in whole or in part by server 140 of FIG. 3, or any combination of computing device.

In this example, DHN 410 includes an authentication broker 420. DHN 410 also includes a DHC manager 430. In one example, DHC manager 430 receives example input signals, such as create DHC 432, register grantee 434, and revoked user 436. Upon receiving any one of these signals, DHC manager 430 may communicate with a secure certificate management engine 440 and certificate revocation list 450.

Certificate management engine 440 may include a database of valid DHCs. Certificate revocation list 450 may include a list of certificates that have been revoked. These two engines interact with authentication broker 420, which also provides an output signal indicating whether the user is authenticated or not. Note that in this example, DHN 160 and certificate authority 180 may be treated as a single entity. However, this need not necessarily be the case. In some examples, certificate authority 180 is a completely separate entity from DHN 160. Depending on the configuration of certificate authority 180, additional communication or configuration may be needed to properly handle the PREDECESSORS field, which is not required by the PKI standard, and thus legacy certificate authorities may not include logic for handling this field.

FIG. 5 is a signal flow diagram of a login attempt of a grantee 122 according to one or more examples of the present specification.

In this example, at operation 1, grantee 122 attempts to login to network service 140 with DHC 130, with ID 2A, and which lists DHC 1A in its PREDECESSORS field. In other words, grantee 122 is an L1 grantee subject to the certificate of Principal 120.

Network service 140 receives the login attempt, and in operation 2 sends to DHN 160 a validation request.

In operation 3, DHN 160 communicates with certificate authority 180 to validate DHC 130 and to determine whether all predecessors have been revoked.

In operation 4, certificate authority 180 provides a CERTIFICATE VALID signal to DHN 160 only if it determines that certificate 130 is a valid certificate, and that all of its predecessor certificates have been revoked.

Upon receiving CERTIFICATE VALID signal, in operation 5, DHN 160 provides to network service 150 a confirmation signal. This informs network service 140 that DHC 130 is valid and that all predecessor DHCs have been revoked, meaning that all conditions precedent have been met.

In operation 6, network service 140 grants access to grantee 122.

Figure 6:
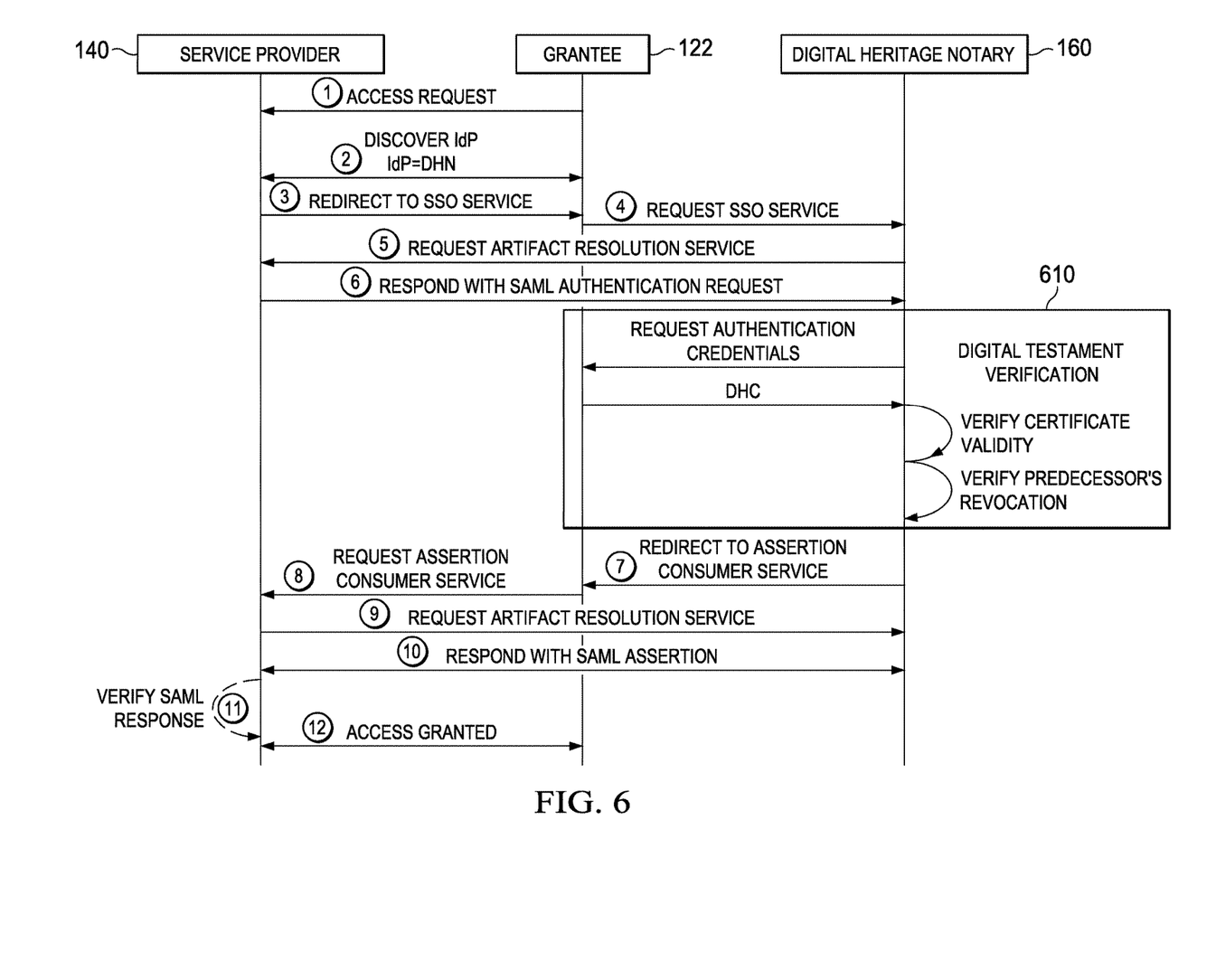
FIG. 6 is a signal flow diagram of an example SAML authentication according to one or more examples of the present Specification.

FIG. 6 is a signal flow diagram disclosing additional details of an access request according to one or more examples of the present specification. This figure discloses with additional detail interaction between grantee 122, a digital asset 610 provided by service provider 140, and DHN 160. This diagram uses SAML as an example of authentication, though this example is non-limiting.

In operation 1, grantee 122 provides an access request to service provider 140.

In operation 2, service provider 140 and grantee 122 perform an identity provider (IdP) discovery. In this case, the IdP is "Digital Heritage Notary."

In operation 3, service provider 140 redirects grantee 122 to an SSO service.

In operation 4, grantee 122 requests SSO service from DHN 160.

In operation 5, DHN 160 requests artifact resolution (authentication credentials) service from service provider 140.

In operation 6, service provider 140 responds with a SAML authentication request to DHN 160.

Meta-block 610 illustrates digital testament verification. DHN 160 requests authentication credentials from grantee 122. Grantee 122 provides DHC 130 to DHN 160. DHN 160 verifies that the certificate is valid (either itself, or by querying a CA 180), and verifies that all predecessor certificates have been revoked (again, either itself or by querying a CA 180 configured to handle transactions with the PREDECESSORS field). If these tests are passed, then DHC 130 is authenticated.

In operation 7, DHN 160 redirects grantee 122 to an assertion consumer service.

In operation 8, grantee 122 requests assertion consumer service from service provider 160.

In operation 9, service provider 160 requests artifact resolution service from DHN 160.

In operation 10, service provider 140 responds with a SAML assertion such as an authentication statement. In one example, the SAML assertion includes an authentication context indicating that all predecessor certificates have been revoked.

In operation 11, service provider 140 internally verifies that the SAML response is satisfactory.

In operation 12, service provider 140 grants grantee 122 access to the digitally-controlled asset.

Figure 7:
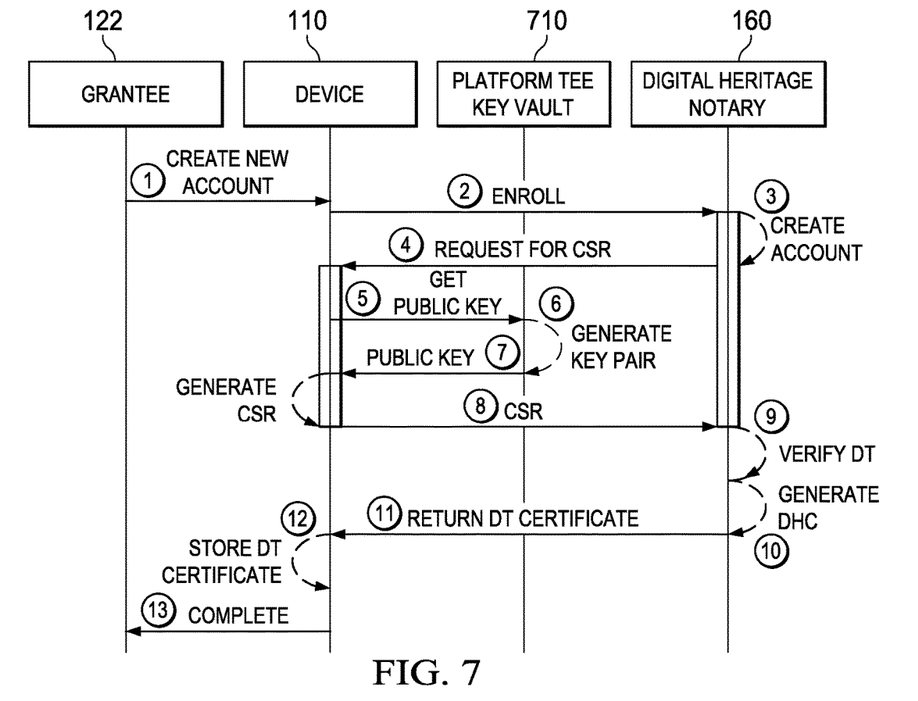
FIG. 7 is a signal flow diagram of establishment of a digital testament according to one or more examples of the present Specification.

FIG. 7 is a signal flow diagram according to one or more examples of the present specification. This figure illustrates establishment of a DT and enrollment of a principal and grantees.

In operation 1, grantee 122 requests creation of a new account via client device 110.

In operation 2, client device 110 requests enrollment for grantee 122 with DHN 160.

In operation 3, DHN 160 creates an account for grantee 122.

In operation 4, DHN 160 provides a certificate signing request (CSR) from client device 110.

In operation 5, client device 110 gets a public key from a platform trusted execution environment (TEE) key vault 710. Platform TEE key vault 710 may include, for example, a memory enclave accessed via special Intel® SGX instructions or a secure coprocessor for trusted computing, or an equivalent.

In operation 6, platform TEE key vault 710 generates a key pair.

In operation 7, platform TEE key vault 710 provides the public key to client device 110.

In operation 8, client device 110 sends the CSR to DHN 160.

In operation 9, DHN 160 internally verifies that the DT is legitimate, and that grantee 122 is a legitimate grantee of the DT.

In operation 10, DHN 160 generates a DHC for grantee 122, including any necessary predecessor DHCs.

In operation 11, DHN 160 returns the DHC to client device 110.

In operation 12, client device 110 stores the DHC in local storage.

In operation 13, the method is complete.

Figure 8:
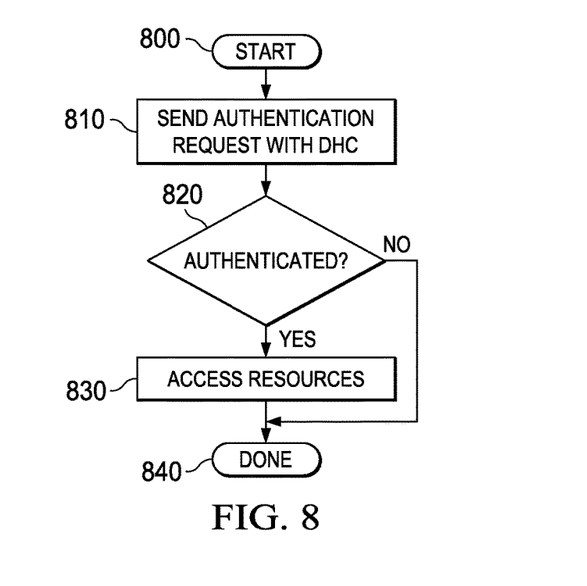
FIG. 8 is a flow chart of a method according to one or more examples of the present Specification.

FIG. 8 is a flow chart of a method 800 according to one or more examples of the present specification. In one example, this method provides authentication via a DHC.

In block 810, client device 110 sends an authentication request with a DHC 130 to a service provider 140. In some cases, sending DHC 130 itself may not be desirable, as it could be intercepted, copied, and/or abused. Thus, in some cases, the request may simply be digitally signed by DHC 130.

In decision block 820, client device 110 waits to determine whether the DHC has been authenticated by service provider 140.

In block 830, if client device 110 successfully authenticated to service provider 140, then client device 110 accesses available resources.

Returning to block 820, if client device 110 was not successfully authenticated, then it is not able to access resources.

In block 840, the method is done.

Figure 9:
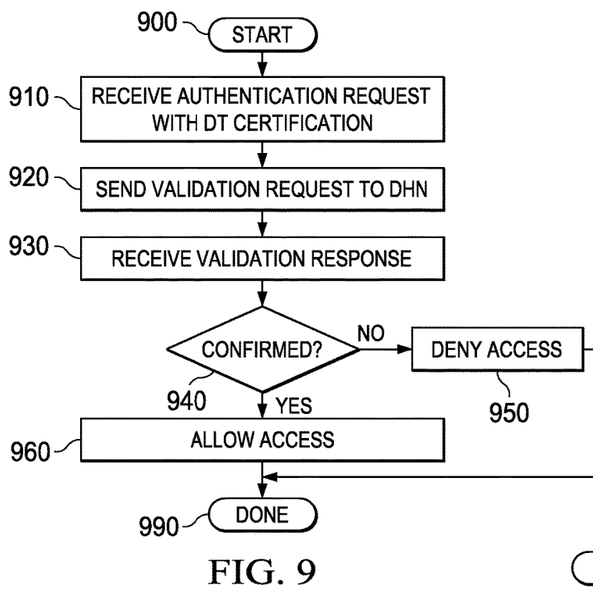
FIG. 9 is a flow chart of a method according to one or more examples of the present Specification.

FIG. 9 is a flow chart of a method 900 according to one or more examples of the present specification. In one example, method 900 is performed by service provider 140.

In block 910, service provider 110 receives an authentication request with an attached DHC 130.

In block 920, service provider 140 sends a validation request to DHN 160.

In block 930, service provider 140 receives from DHN 160 a response to the validation request. This transaction is illustrated in more detail in FIG. 6.

In decision block 940, the validation request is either confirmed or not.

In block 960, if the request is confirmed, then service provider 140 grants client device 110 access to available resources.

Returning to decision block 940, if the validation was not confirmed, then in block 950, service provider 140 denies access.

In block 990, the method is done.

Figure 10:
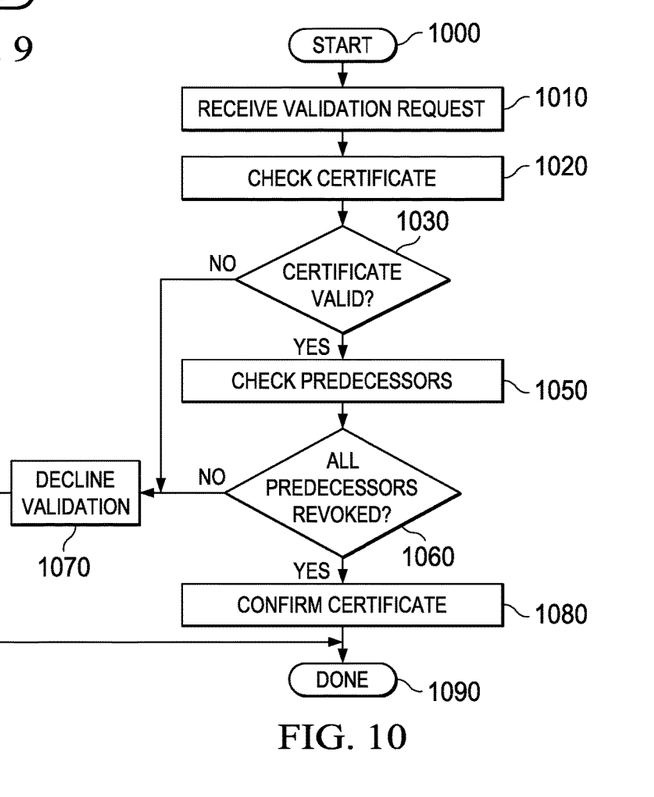
FIG. 10 is a flow chart of a method according to one or more examples of the present Specification.

FIG. 10 is a block diagram of a method 1000 according to one or more examples of the present specification. In one example, this method may be performed by DHN engine 324.

In block 1010, DHN 160 receives a validation request, with an attached DHC 130, from service provider 140.

In block 1020, DHN 160 checks the certificate, for example as illustrated in FIG. 5.

In decision block 1030, DHN 160 determines whether the DHC is valid.

In block 1050, if the DHC is valid, then DHN 160 checks the predecessors of the valid DHC.

In decision block 1060, DHN 160 determines whether all predecessors have been revoked. If so, then in block 1080, DHN 160 confirms the certificate, and in block 1090 the method is done.

Returning to decision block 1030, if the certificate is not valid, or if in block 1060 all predecessors have not been revoked, then in block 1070, DHN 160 declines validation.

In block 1090, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112, as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in an example 1, a computing apparatus comprising: one or more logic elements comprising a DHN engine operable for: receiving a request to establish a digital testament (DT) for a principal; assigning the principal a principal digital heritage certificate (DHC), the principal DHC having no predecessor certificate; receiving a request to establish an grantee of the DT; and assigning the grantee an grantee's DHC with the principal DHC as a predecessor certificate.

There is disclosed in an example 2, the computing apparatus of example 1, wherein the grantee is a level 1 grantee, the grantee's DHC is a level 1 grantee's DHC, and the DHN engine is further operable for: receiving a request to establish a level 2 grantee of the DT; and assigning the level 2 grantee a level 2 grantee's DHC with the level 1 grantee's DHC and the principal DHC as predecessor certificates.

There is disclosed in an example 3, the computing apparatus of example 1, wherein the DHN engine is further operable for: receiving a revocation request for a DHC; and causing a certificate revocation list (CRL) to be published indicating that the DHC has been revoked.

There is disclosed in an example 4, the computing apparatus of example 1, wherein the DHN engine is further operable for: receiving an authentication attempt from an grantee, the authentication attempt including a DHC having at least one predecessor certificate; and confirming authentication only if all predecessor certificates of the DHC have been revoked.

There is disclosed in an example 5, the computing apparatus of example 4, wherein the authentication attempt comprises a single-sign-on service request.

There is disclosed in an example 6, the computing apparatus of example 4, wherein the authentication attempt comprises an authentication service assertion.

There is disclosed in an example 7, the computing apparatus of example 6, wherein the SAML assertion is an authentication statement.

There is disclosed in an example 8, the computing apparatus of example 6, wherein the authentication service assertion requires all predecessor certificates to be revoked.

There is disclosed in an example 9, the computing apparatus of example 4, wherein the authentication attempt comprises an extensible access control markup language (XACML) access control rule.

There is disclosed in an example 10, the computing apparatus of example 9, wherein the XACML access control rule comprises a condition that any predecessor certificates to be revoked.

There is disclosed in an example 11, the computing apparatus of any of examples 1-9, wherein the DHN engine is further operable for: receiving a validation request from a network service, the validation request including a DHC;

and confirming the validation request only if any predecessor certificates of the DHC have been revoked.

There is disclosed in an example 12, the computing apparatus of example 11, wherein confirming the validation request only if any predecessor certificates of the DHC have been revoked comprises: providing a validate certificate query to a certificate authority; querying a certificate revocation list to determine if any predecessor certificates of the DHC have been revoked; and confirming the validation request only if the certificate authority returns a certificate valid response and only if any predecessor certificates of the DHC appear on the certificate revocation list.

There is disclosed in an example 13, the computing apparatus of any of examples 1-9, wherein at least one DHC is a public key infrastructure (PKI) certificate.

There is disclosed in an example 14, one or more computer-readable mediums having stored thereon executable instructions for providing a DHN engine operable for: receiving a request to establish a digital testament (DT) for a principal; assigning the principal a principal digital heritage certificate (DHC), the principal DHC having no predecessor certificate; receiving a request to establish an grantee of the DT; and assigning the grantee an grantee's DHC with the principal DHC as a predecessor certificate.

There is disclosed in an example 15, the one or more computer-readable mediums of example 14, wherein the grantee is a level 1 grantee, the grantee's DHC is a level 1 grantee's DHC, and the DHN engine is further operable for: receiving a request to establish a level 2 grantee of the principal; and assigning the level 2 grantee a level 2 grantee's DHC with the level 1 grantee's DHC and the principal's DHC as predecessor certificates.

There is disclosed in an example 16, the one or more computer-readable mediums of example 14, wherein the DHN engine is further operable for: receiving a revocation request for a DHC; and causing a certificate revocation list (CRL) to be published indicating that the DHC has been revoked.

There is disclosed in an example 17, the one or more computer-readable mediums of example 14, wherein the DHN engine is further operable for: receiving an authentication attempt from an grantee, the authentication attempt including a DHC; and providing authentication only if all predecessor certificates of the DHC have been revoked.

There is disclosed in an example 18, the one or more computer-readable mediums of example 17, wherein the authentication attempt comprises a single-sign-on service request.

There is disclosed in an example 19, the one or more computer-readable mediums of example 17, wherein the authentication attempt comprises a security assertion markup language (SAML) assertion.

There is disclosed in an example 20, the one or more computer-readable mediums of example 19, wherein the SAML assertion is an authentication statement.

There is disclosed in an example 21, the one or more computer-readable mediums of any of examples 14-20, wherein the DHN engine is further operable for: receiving a validation request from a network service, the validation request including a DHC; and confirming the validation request only if all predecessor certificates of the DHC have been revoked.

There is disclosed in an example 22, the one or more computer-readable mediums of example 21, wherein confirming the validation request only if all predecessor certificates of the DHC have been revoked comprises: providing a validate certificate query to a certificate authority; querying a certificate revocation list to determine if any predecessor certificates of the DHC have been revoked; and confirming the validation request only if the certificate authority returns a certificate valid response and only if any predecessor certificates of the DHC appear on the certificate revocation list.

There is disclosed in an example 23, the one or more computer-readable mediums of any of examples 14-20, wherein at least one DHC is a public key infrastructure (PKI) certificate.

There is disclosed in an example 24, a method of providing a DHN comprising: receiving a request to establish a digital testament (DT) for a principal; assigning the principal a principal digital heritage certificate (DHC), the principal DHC having no predecessor certificate; receiving a request to establish an grantee of the DT; and assigning the grantee an grantee's DHC with the principal DHC as a predecessor certificate; receiving a request to establish a level 1 grantee of the DT; assigning the level 1 grantee a level 1 grantee's DHC with the principal's DHC as a predecessor certificate; receiving a request to establish a level 2 grantee of the principal; and assigning the level 2 grantee a level 2 grantee's DHC with the level 1 grantee's DHC and the principal's DHC as predecessor certificates.

There is disclosed in an example 25, the method of example 24, further comprising: receiving an authentication attempt from an grantee, the authentication attempt including a DHC; and providing authentication only if any predecessor certificates of the DHC have been revoked.

There is disclosed in an example 26, a method comprising the performing the instructions disclosed in any of examples 14-23.

There is disclosed in example 27, an apparatus comprising means for performing the method of example 26.

There is disclosed in example 28, the apparatus of claim 27, wherein the apparatus comprises a processor and memory.

There is disclosed in example 29, the apparatus of claim 28, wherein the apparatus further comprises a computer-readable medium having stored thereon software instructions for performing the method of example 26.

What is claimed is:
1. A computing apparatus comprising:
a hardware computing platform comprising at least a processor and memory configured to provide a hierarchical digital heritage notary (DHN) engine operable for:
receiving a request to establish a digital testament (DT) for a human principal, the human principal being a level 0 (L0) user;
assigning the principal an L0 principal digital heritage certificate (DHC) (L0 certificate), the principal DHC having no predecessor certificate;
receiving a request to establish a plurality of grantees of the DT, the plurality of grantees comprising at least a level 1 (L1) grantee and one or more level 2 (L2) grantees; and
assigning the L1 grantee an L1 DHC (L1 certificate) with the principal DHC as a predecessor certificate to the L1 grantee's certificate, wherein death of the principal and revocation of the L0 certificate are conditions precedent for validity of the L1 certificate; and
assigning the one or more L2 grantees L2 DHCs (L2 certificates), wherein death of the L1 grantee is a condition precedent for validity of the L2 certificates.

2. The computing apparatus of claim 1, wherein the hierarchical DHN engine is further operable for:
  receiving a revocation request for a DHC; and
  causing a certificate revocation list (CRL) to be published indicating that the DHC has been revoked.

3. The computing apparatus of claim 1, wherein the hierarchical DHN engine is further operable for:
  receiving an authentication attempt from a grantee, the authentication attempt including a DHC having at least one predecessor certificate; and
  confirming authentication only if all predecessor certificates of the DHC have been revoked.

4. The computing apparatus of claim 3, wherein the authentication attempt comprises a single-sign-on service request.

5. The computing apparatus of claim 3, wherein the authentication attempt comprises an authentication service assertion.

6. The computing apparatus of claim 5, wherein the authentication service assertion is an authentication statement.

7. The computing apparatus of claim 5, wherein the authentication service assertion requires all predecessor certificates to be revoked.

8. The computing apparatus of claim 3, wherein the authentication attempt comprises an extensible access control markup language (XACML) access control rule.

9. The computing apparatus of claim 8, wherein the XACML access control rule comprises a condition that any predecessor certificates be revoked.

10. The computing apparatus of claim 1, wherein the DHN engine is further operable for:
  receiving a validation request from a network service, the validation request including a DHC; and
  confirming the validation request only if any predecessor certificates of the DHC have been revoked.

11. The computing apparatus of claim 10, wherein confirming the validation request only if any predecessor certificates of the DHC have been revoked comprises:
  providing a validate certificate query to a certificate authority;
  querying a certificate revocation list to determine if any predecessor certificates of the DHC have been revoked; and confirming the validation request only if the certificate authority returns a certificate valid response and only if any predecessor certificates of the DHC appear on the certificate revocation list.

12. The computing apparatus of claim 1, wherein at least one DHC is a public key infrastructure (PKI) certificate.

13. One or more computer-readable mediums having stored thereon executable instructions for providing a hierarchical digital heritage notary (DHN) engine operable for:
  receiving a request to establish a digital testament (DT) for a human principal, the human principal being a level 0 (L0) user;
  assigning the principal a n L0 principal digital heritage certificate (DHC) (L0 certificate), the principal DHC having no predecessor certificate;
  receiving a request to establish a plurality of grantees of the DT, the plurality of grantees comprising at least a level 1 (L1) grantee and one or more level 2 (L2) grantees; and
    assigning the L1 grantee an L1 DHC (L1 certificate) with the principal DHC as a predecessor certificate to the L1 grantee's certificate, wherein death of the principal and revocation of the L0 certificate are conditions precedent for validity of the L1 certificate; and
    assigning the one or more L2 grantees L2 DHCs (L2 certificates), wherein death of the L1 grantee is a condition precedent for validity of the L2 certificates.

14. The one or more computer-readable mediums of claim 13, wherein the hierarchical DHN engine is further operable for:
  receiving a revocation request for a DHC; and
  causing a certificate revocation list (CRL) to be published indicating that the DHC has been revoked.

15. The one or more computer-readable mediums of claim 13, wherein the hierarchical DHN engine is further operable for:
  receiving an authentication attempt from a grantee, the authentication attempt including a DHC having at least one predecessor certificate; and
  providing authentication only if all predecessor certificates of the DHC have been revoked.

16. The one or more computer-readable mediums of claim 15, wherein the authentication attempt comprises a single-sign-on service request.

17. The one or more computer-readable mediums of claim 15, wherein the authentication attempt comprises a security assertion markup language (SAML) assertion.

18. The one or more computer-readable mediums of claim 17, wherein the SAML assertion is an authentication statement.

19. The one or more computer-readable mediums of claim 13, wherein the DHN engine is further operable for:
  receiving a validation request from a network service, the validation request including a DHC; and
  confirming the validation request only if any predecessor certificates of the DHC have been revoked.

20. The one or more computer-readable mediums of claim 19, wherein confirming the validation request only if all predecessor certificates of the DHC have been revoked comprises:
  providing a validate certificate query to a certificate authority;
  querying a certificate revocation list to determine if any predecessor certificates of the DHC have been revoked; and confirming the validation request only if the certificate authority returns a certificate valid response and only if any predecessor certificates of the DHC appear on the certificate revocation list.

21. The one or more computer-readable mediums of claim 13, wherein at least one DHC is a public key infrastructure (PKI) certificate.

22. A method of providing a DHN comprising:
  receiving a request to establish a digital testament (DT) for a human principal, the human principal being a level 0 (L0) user;
  assigning the principal an L0 principal digital heritage certificate (DHC) (L0 certificate), the principal DHC having no predecessor certificate;
  receiving a request to establish a plurality of grantees of the DT, the plurality of grantees comprising at least a level 1 (L1) grantee and one or more level 2 (L2) grantees; and
  assigning the L1 grantee an L1 DHC (L1 certificate) with the principal DHC as a predecessor certificate to the L1 grantee's certificate;
  receiving a request to establish a level 2 grantee of the principal; and assigning the level 2 grantee a level 2 grantee's DHC with the level 1 grantee's DHC and the principal's DHC as predecessor certificates, wherein death of the principal and revocation of the L0 certificate are conditions precedent for validity of any certificate with a predecessor certificate.

23. The method of claim 22, further comprising:

receiving an authentication attempt from a grantee, the authentication attempt including a DHC; and providing authentication only if any predecessor certificates of the DHC have been revoked.

* * * * *

UNITED STATES PATENT AND TRADEMARK OFFICE
CERTIFICATE OF CORRECTION

PATENT NO. : 9,948,468 B2  
APPLICATION NO. : 14/582150  
DATED : April 17, 2018  
INVENTOR(S) : Alex Nayshtut et al.

Page 1 of 1

It is certified that error appears in the above-identified patent and that said Letters Patent is hereby corrected as shown below:

On the Title Page

Item (71), delete "Santa Clara, CA (US)" and insert -- Plano, TX (US) --, therefor.

Item (57), Line 9, delete "0," and insert -- 0 --, therefor.

Signed and Sealed this  
Tenth Day of July, 2018

Andrei Iancu  
*Director of the United States Patent and Trademark Office*